(12) United States Patent
Soe (10) Patent No.: US 6,336,211 B1
(45) Date of Patent: Jan. 1, 2002

(54) METHOD AND APPARATUS FOR IMPLEMENTING TYPE-SAFE HETEROGENEOUS PROPERTY LISTS

(75) Inventor: Soren T. Soe, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/315,897

(22) Filed: May 20, 1999

(51) Int. Cl.[7] ................................................. G06F 9/45
(52) U.S. Cl. ............................................... 717/1; 707/1
(58) Field of Search ........................... 717/1, 11; 707/1

(56) References Cited

U.S. PATENT DOCUMENTS

| | | | | |
|---|---|---|---|---|
| 5,889,992 A | * | 3/1999 | Koerber ........................ | 717/2 |
| 6,049,805 A | * | 4/2000 | Drucker et al. .............. | 707/102 |
| 6,083,276 A | * | 7/2000 | Davidson et al. ............. | 717/1 |
| 6,212,436 B1 | * | 4/2001 | Marple et al. ................ | 700/10 |
| 6,263,339 B1 | * | 7/2001 | Hirsch ........................ | 707/102 |
| 6,268,852 B1 | * | 7/2001 | Lindhorst et al. ........... | 345/335 |

OTHER PUBLICATIONS

Wu. Supporting General Queries in an Object Management System. ACM. 1992. pp. 258–263.*
Bjornerstedt et al. AVANCE: An Object Management System. ACM. 1988. pp. 206–221.*

* cited by examiner

Primary Examiner—Mark R. Powell
Assistant Examiner—Wei Zhen
(74) Attorney, Agent, or Firm—LeRoy D. Maunu

(57) ABSTRACT

A method and apparatus for implementing type-safe, heterogeneous object-oriented property lists. A library of classes and template classes implementing a heterogeneous property list is defined, wherein each object of the property list includes a property name and an associated property value of a selected property type. Instantiation of objects having equal property names and unequal property types is prevented with a constructor, and template functions are provided each of which accesses the objects of the property list according to a type of data passed to the function.

18 Claims, 4 Drawing Sheets

METHOD AND APPARATUS FOR IMPLEMENTING TYPE-SAFE HETEROGENEOUS PROPERTY LISTS

COPYRIGHT NOTICE

A portion of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to property lists implemented in object-oriented programming languages, and more particularly to an implementation of a heterogeneous property list that is type-safe.

BACKGROUND OF THE INVENTION

A property list is a list of attributed value pairs, where each pair associates a key (the attribute) with a value. In a heterogeneous property list, the values are of different types.

A property list is a LISP concept, and is useful for attaching information to objects or symbols. In extended Backus-Naur Form a property list may be defined as:

| | |
|---|---|
| <PropertyList> | (<Property> <PropertyList>) |
| <Property> | (<PropName> <PropValue>) |
| <PropName> | is the name of a property |
| <PropValue> | is the value of the property |

There are Put and Get functions associated with a property list. A property is inserted in a list by providing a property name and property value as input to the Put function:

Put(propertylist, propname, propvalue)

Similarly, a property value is retrieved by providing the property name that identifies the value as input to the Get function:

value=Get(propertylist,propname)

A property list may be included as a data member of a class and used to store many types of information with regard to objects of the class. Property lists are often used when it would be too expensive to add a regular data member for the information. A property list may be more desirable than a regular data member when only a few objects of a given class would ever need the information, or if the information is only needed temporarily.

An example where only a few objects of a given class would ever need the information is where all objects of a class have a default value and only a few objects need to overwrite the default value. Consider the employees of a United States company where 99% are U.S. citizens. Rather than storing citizenship for all employees using a regular data member, a property list can instead be used to indicate when an employee's citizenship is other than U.S. A function that gets the citizenship of an employee checks the property list for the presence of a citizenship property value. If a citizenship property value is present, that value is returned, otherwise the value "U.S." is returned.

An example where the information is only needed temporarily is a verification phase that converts all objects of a class into a canonical form. After conversion to canonical form, the objects are sorted and duplicate objects are removed. Once the duplicate objects have been removed, the canonical form is no longer needed and can be discarded.

A disadvantage of using a property list over a regular data member is that the property list itself requires additional memory. A property value is always associated with a property name, while only the property value is needed if implemented as a regular data member. Another disadvantage is that inserting and retrieving a property value involves searching the list for a matching property name. The additional memory implies that a property list should be used only when there is a need for recording more than a few properties. Once the property list has been included as a data member of a class, a property should be used instead of a regular data member only if the property is short lived or recorded with only a few objects, and the extra overhead in accessing the property value is relatively unimportant. It will be appreciated that the overhead in inserting and retrieving a property can be reduced by implementing the list as a hash table, for example.

A heterogeneous property list is an associative container capable of storing objects or pointers to objects of different types. For example, a heterogeneous property list for an employee object might include a salary property having a real number value and a citizenship property having a character string value.

A property list can be created to store the data as a generic pointer, leaving to user programs the requirement to cast the data to the proper type when retrieving it. However, the disadvantage of this approach is that the data are not type safe. That is, data corruption may occur if the user program does not cast the data to the appropriate type. Furthermore, only pointers to the objects can be stored rather than the objects themselves. A method that address the aforementioned problems, as well as other related problems, is therefore desirable.

SUMMARY OF THE INVENTION

A method and an apparatus for implementing type-safe, heterogeneous object-oriented property lists are provided in various embodiments of the invention. In one embodiment, a library of classes and template classes implementing a heterogeneous property list is defined, wherein each object of the property list includes a property name and an associated property value of a selected property type. Instantiation of objects having equal property names and unequal property types is prevented with a constructor, and template functions are provided each of which accesses the objects of the property list according to a type of data passed to the function.

In another method for implementing type-safe property lists, a first class having a property name and a property type is defined. A second class is defined as having a pointer to an object of the first class and a constructor that aborts a program instantiating an object of the second class if, for another object of the first class having a property name and property type, an input property name matches the property name of the other object and an input property type does not match the property type of the other object. A third class is defined as having a member that is an object of the second class. A first template class is defined as having a constructor that passes a property name and property type to the constructor of the second class. A second template class is defined as having a constructor that passes an object of the first template class to the third class, a property value member, and one or more member functions for accessing the property value member. A property list class is defined as having template functions that get and put objects of the second template class in a property list object, wherein the template functions have property type and property value inputs. Selected objects of the second template class are used to instantiate a property list object.

In another embodiment, an apparatus is provided for implementing object-oriented property lists. The apparatus comprises: means for defining a library of classes and template classes implementing a heterogeneous property list, wherein each object of the property list includes a property name and an associated property value of a selected property type; means for providing a constructor that prevents instantiation of objects having equal property names and unequal property types; and means for providing template functions each of which accesses the objects of the property list according to a type of data passed to the function.

The above summary of the present invention is not intended describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings, in which.

While the invention is susceptible to various modifications and alternative forms, specific embodiments thereof have been shown by way of example in the drawings and are described herein in detail. It should be understood, however, that the detailed description is not intended to limit the invention to the particular forms disclosed. On the contrary, the intent is to cover all modifications, equivalents, and alternatives falling within the spirit and scope of the invention as defined by the appended claims.

DETAILED DESCRIPTION OF THE DRAWINGS

The present invention is applicable to a variety of object-oriented programming languages, and has been found to be particularly applicable and beneficial for implementing type-safe heterogeneous property lists in C++. While the present invention is not so limited, an appreciation of the present invention is presented by way of specific examples implemented in C++. The application is written assuming familiarity with C++ and object oriented concepts. The symbols in the figures conform to the well-known Unified Modeling Language (UML).

In an example embodiment of the invention, type-safe heterogeneous property lists are implemented using various C++ classes, template classes, and constructors. The property list is capable of storing objects as well as pointers to objects, and the objects can be of any data type, both user-defined and language-defined. The example implementation uses newer features of standard C++, such as "typeid" and "member function templates." The example implementation provided herein can be compiled with Visual C++ 5.0.

Figure 1:
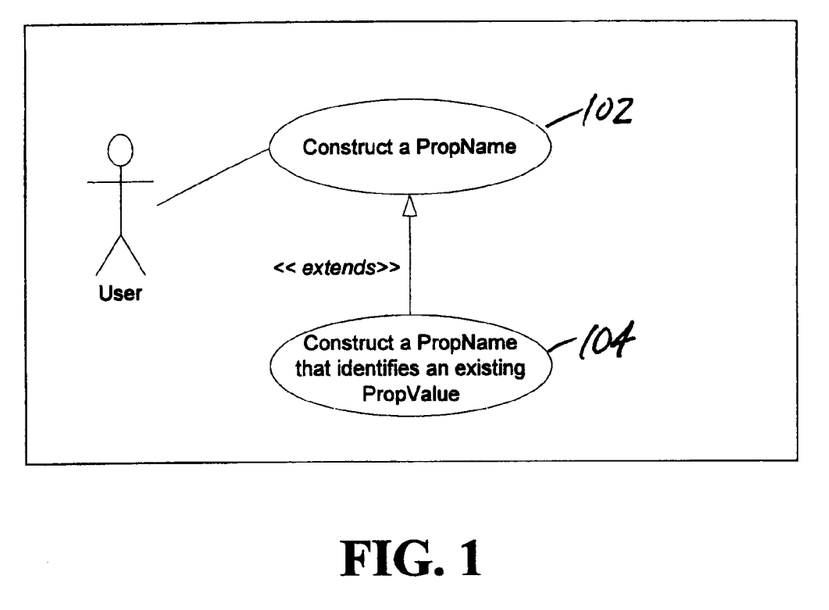
FIG. 1 is a use-case diagram that illustrates a basic requirement of a property name object.

Property name objects are used to identify property values in a property list. FIG. 1 is a use-case diagram that illustrates a basic requirement of a property name object, PropName. That is, the construction of different property name objects to identify the same property value, PropValue.

As shown in FIG. 1, a user must be able to construct multiple property names that all identify the same property value. This ability is useful where a property is created and stored in one part of a user program and retrieved or changed in another part of the program that does not have access to the original property name object. Bubble 102 illustrates construction of a property name object, PropName, by the user. Bubble 104 shows construction of an additional PropName object that identifies an existing PropValue.

The type of a property name is T if the property name is: associated with a property value of type T; used to retrieve a property value of type T; or used to store a property value of type T. Thus, the user must not be allowed to use the same property name to store and retrieve more than one type of data.

Figure 2:
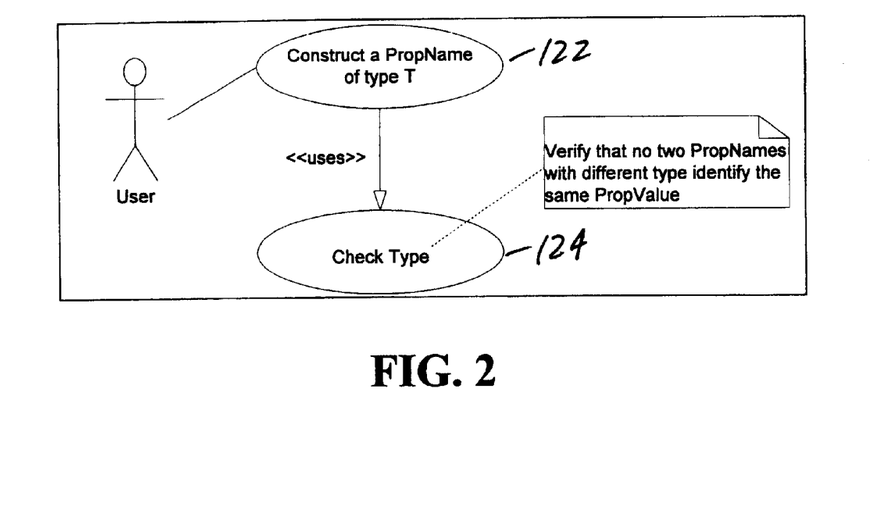
FIG. 2 is a use-case diagram that illustrates data type-checking in constructing property name objects.

FIG. 2 is a use-case diagram that illustrates data type-checking in constructing property name objects. For example, an error is detected if one function stores a salary property of type real in a property list, and another function wants to store (or retrieve) the same salary property as a character string.

A property name object contains a reference to a shared object, which has a unique name and is the actual identifier for the property value. The property name inherits the type of the property value that is associated with the property name by letting the shared object contain information about the type. Thus, the PropName object having a property type T is constructed at bubble 122. Bubble 124 checks the type T associated with the new PropName object against other PropName objects. Specifically, the new PropName can be constructed if no other PropName object with a type other than T references the same property value, PropValue, as the new PropName object of bubble 122. In other words, no two PropName objects with different types are allowed to identify the same PropValue.

Figure 3A:
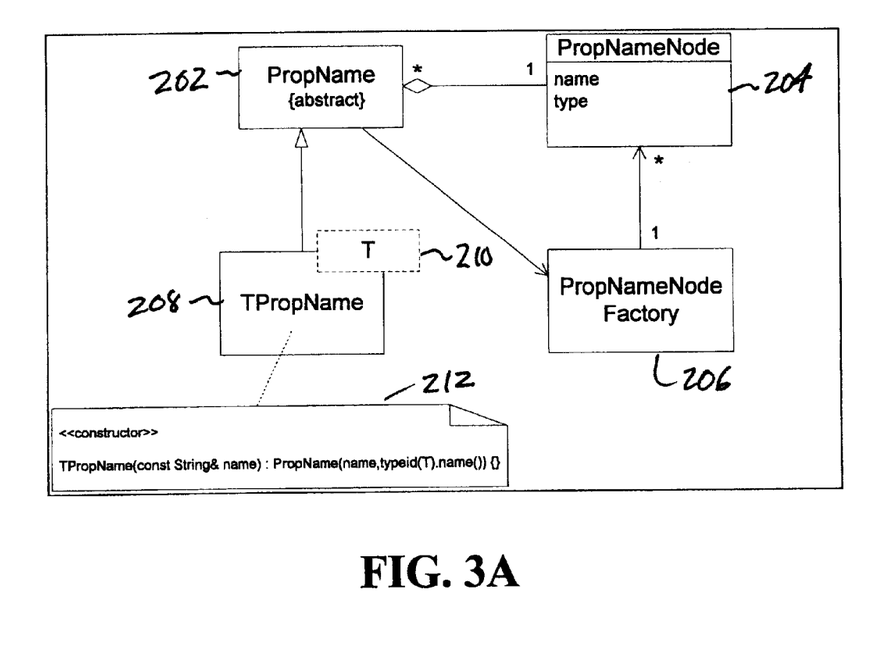
FIG. 3A shows a class diagram for the property name class.

FIG. 3A shows a class diagram for an example property name class. The property name PropName 202 is comprised of a single PropNameNode 204. PropNameNode 204 may belong to several PropNames over time. A PropNameNode encapsulates the name that is used to identify the property value in the property list, and it encapsulates the name of the type of this property value. A different class is required for each different type of property value to be stored in the property list. These classes are all derived from base class PropName as shown in FIG. 3A. The purpose of the TPropName class 208 is to pass the type of the property value to the base class PropName 202. Thus, there is a TPropName class 208 for each desired data type.

Construction of PropNameNode 204 is performed via PropNameNodeFactory 206. PropNameNode 204 belongs to exactly one PropNameNodeFactory 206, which in turn may control any number of PropNameNodes 204. PropNameNodeFactory 206 is a singleton and accessible only to class PropName.

An example implementation of classes for PropNameNode, PropName, and TPropName is shown in Listing 1 of the Appendix. The PropNameNodeFactory is implemented as a mapping from string to PropNameNodePtr within the PropName class. Class PropNameNode is reference counted, which allows several PropName objects to share the same PropNameNode object, and when the last reference to a PropNameNode is deleted, the PropNameNode itself is deleted. A wrapper (class PropNameNodePtr) around class PropNameNode provides storage for PropNameNode in a value based container.

PropName class 202 is abstract and the implementing classes are instantiations of a TPropName template class 208. A TPropName class 208 has an associated type T 210. One constructor 212, of the three constructors in the example implementation, is shown in FIG. 3A for class TPropName 208. The three constructors for Class TPropName (as shown in Listing 1 of the Appendix) are:

TPropName(const char* pname):
    PropName(pname,typeid(T).name()) { }
TPropName(int zero): PropName(0) {assert(zero==0); }
TPropName(const TPropName<T>& pn): PropName(pn)
    { }

The first constructor allows the user to construct a property name by specifying the name of the property. For example:

TPropName<int> myProp("this is a propname associated with type int")

This constructor passes the name of the type (int) and the name of the property ("this is a propname associated with type int") to the base class PropName. The name of the type can be obtained, for example, by calling: typeid(T).name(). The object, myProp, has the indicated property name and a type of integer.

The second constructor for class TPropName allows the user to pass 0 as a PropName to routines, which in turn can test for the validity of a PropName. For example:

void Foo(const TPropName<int>& p=0){ if (p) . . . }

This constructor allows objects of class PropName to behave as pointers; the value 0 can be passed in place of a PropName object just as 0 can be passed in place of a pointer. This ability is useful in functions that take PropName objects as arguments (e.g., where the caller may or may not have a PropName to pass as an argument). It is also useful in functions that return PropName objects. For example, a function could be invoked to return a specific PropName object from a list of known PropName objects. If the matching PropName object is present in the list then the PropName is returned, otherwise 0 is returned; the caller can test the return value.

The third constructor is a copy constructor.

The PropName constructor (PropNameNodeFactory) takes as input a property name and a property type. The PropName constructor maintains a list of instantiated PropNameNode objects having the associated property names and property types. If the input property name is the same as the property name in one of the PropNameNode objects and the associated type matches the input property type, then a reference count associated with the PropNameNode object is incremented. If the input property name is the same as the property name in one of the PropNameNode objects and the associated type does not match the input property type, then the PropName constructor aborts the program attempting to instantiate the object. Thus, the constructor prevents instantiation of PropNameNodes having the same name and different types. If the input property name does not already exist in one of the PropNameNode objects, then a new PropNameNode object is instantiated with the input name and type.

Figure 3B:
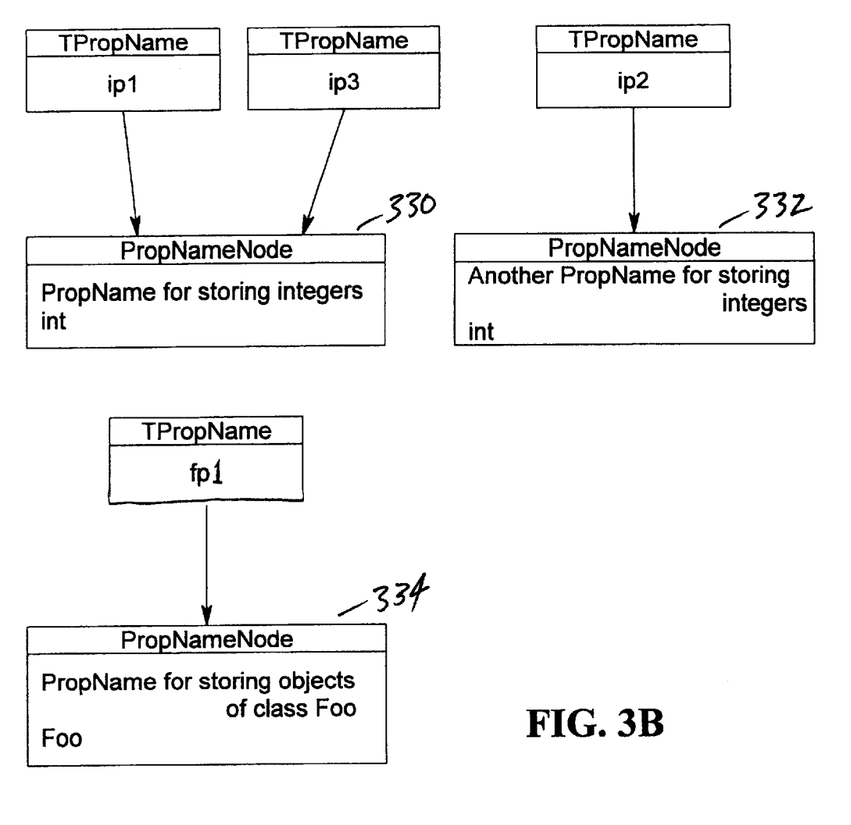
FIG. 3B illustrates TPropName objects and the associated PropNameNodes.

The following example illustrates construction of different PropName and PropNameNode objects using TPropName classes, as illustrated in FIG. 3B.

typedef TPropName<int> intProp;
class Foo;
typedef TPropName<Foo> FooProp;
intProp ip1("PropName for storing integers");
intProp ip2("Another PropName for storing integers");
intProp ip3("PropName for storing integers");
FooProp fp1("PropName for storing objects of class Foo");

The typedef statements for intProp and FooProp indicate that a user desires to store objects of types int and Foo. Property name objects ip1 and ip2 are instantiated with different property names, and property name object ip3 is instantiated with the same property name as object ip1. Referring to FIG. 3B, there are four TPropName objects ip1, ip2, ip3, and fp1, but only 3 PropNameNode objects 330, 332, and 334. TPropName objects ip1 and ip3 share the same PropNameNode object, and therefore identify the same property value. TPropName object ip2 references a different PropNameNode object from objects ip1 and ip3, and TPropName object fp1 references yet another PropNameNode object. The preceding example code illustrates the example usage shown in FIG. 1.

The following two statements illustrate the example usage shown in FIG. 2, which in this case would result in a runtime error:

intProp ip("my prop");
FooProp fp("my prop");

When constructing the PropName object fp the PropNameNodeFactory finds an existing PropNameNode with the name "my prop." A run-time error results, because the type of the PropNameNode object created by the first statement is "int", which is different from the type "Foo" in the second statement.

It will be appreciated that there is no predefined class for implementing a property value. The type of a property value is determined by the user and can be a user-defined class, a fundamental type, or a pointer to either.

A Property class encapsulates a PropName class and a property value, and represents an element to be inserted in a property list. Since the property value can be any type, a different class is needed for each type of data encapsulated by the Property. These different classes are derived from the base property class as shown in the class diagram of FIG. 4.

Figure 4:
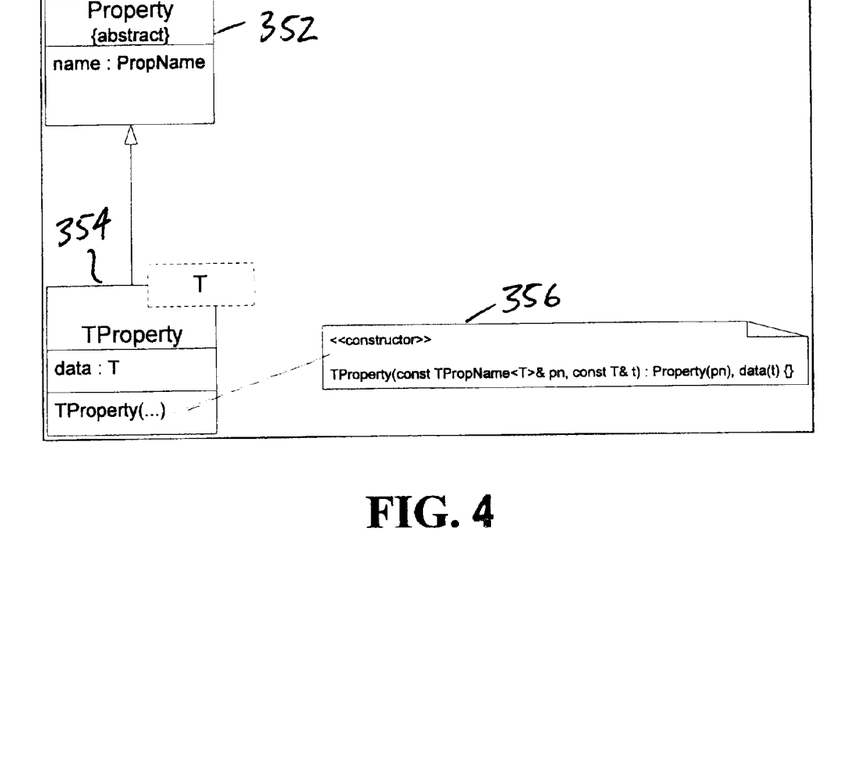
FIG. 4 is a class diagram for an example Property class.

Property class 352 encapsulates the name, which is of the type class PropName. The purpose of the name is to represent the key that is used for comparison when searching the property list for a matching object. The implementing classes are instantiations of a template class Tproperty 354. TProperty class 354 encapsulates the data value of type T and provides an interface for accessing the data value. Thus, there is a TProperty class for each desired data type. Once a PropNameNode object is created with a particular type, the type of the associated TProperty object is also fixed to the same type.

A TPropName object 208 (FIG. 3A) is input to constructor 356 for TProperty, along with the value to be associated with the TPropName object for the base Property class 352. It will be appreciated that a Property object can only be constructed from a PropName of the same type as the data value passed to the constructor of TPropName (class 208 of FIG. 3A). This requirement ensures that with a reference to a base Property object and a TPropName object, the data of the Property object can be accessed in a type-safe manner, as in the following example.

```
void Foo (const TpropName<int>& pnm,
         const Property& p)
{
  if (p.GetPropName() == pnm)
  {
    const TProperty<int>& tp =
        static_cast<const TProperty<int>&>(p);
    int i = tp.GetData();
    ...
  }
}
```

The static cast is guaranteed to be safe, i.e., no run-time type identification is needed to perform the cast. Not only is "pnm" a key to the Property object, it also provides the type of the Property object. The Property object is cast to its concrete type and the data is accessed through the interface of the concrete type.

The implementation of the classes for Property is shown in Listing 2 of the Appendix. A user is not required to know the Property class hierarchy. The only purpose of the Property class hierarchy is to represent an element to be inserted into the property list. Consequently, all members of class TProperty are private and only accessible by friend class PropertyList.

Figure 5:
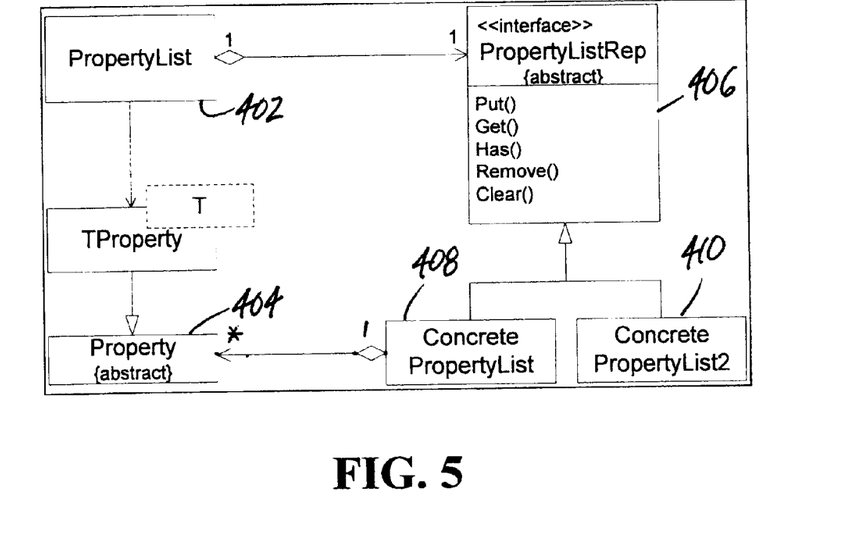
FIG. 5 is an example class diagram implementing a property list.

Turning now to FIG. 5, PropertyList class 402 includes, from a user's perspective, objects of Property class 404 and provides the user interface for storing and retrieving property values associated with property names. Since the property list must be type-safe and capable of storing any type of data, it must have different member functions for the types of data that need to be stored and retrieved. Furthermore, since it is impossible to predict all the different types of data a user might want to store in a property list, the member functions need to be created on demand. A C++ feature known as "member function templates" is suitable for this purpose. Member function templates are described in the C++ standard referenced as ISO/IEC 14882.

The example code below illustrates template Put and Get functions.

```
class PropertyList
{
    ...
public:
    ...
    template<class T> void Put (const TPropName<T>& p,
                                 const T& data);
    template<class T> T& Get(const TPropName<T>& p);
    ...
}
```

These member functions are instantiated automatically for each type of data and TPropName object that are passed as arguments. Recall that a TPropName object includes the type of the property value.

FIG. 5 shows the classes comprising a property list. PropertyList class 402 encapsulates a reference to PropertyListRep abstract class 406, which represents the interface expected by class PropertyList for storing and retrieving Property objects.

An object of class Property belongs to exactly one Concrete PropertyList object. A Concrete PropertyList object contains any number of Property objects. Class Concrete PropertyList depends on class Property, but class Property does not depend on class Concrete PropertyList. Concrete PropertyList class 408 and Concrete PropertyList2 410 are example containers for managing objects in the property list. For example, some applications may require a linked list, while others may require hash tables, balanced trees, or arrays. The implementation of the classes for PropertyList is shown in Listing 3 of the Appendix.

Listing 4 of the Appendix shows an example implementation of a self-modifying linked property list. Every time a Property is referenced it is moved to the front of the list. This approach pushes infrequently-referenced properties to the end of the list and speeds access to frequently-referenced properties.

The example property list functions shown in Listing 4 include get, put, remove, has, and clear. The get function returns a property value from a property list given an input property name; the put function adds a property object to a property list given an input property name object and a property value; the remove function deletes an object from a property list given an input property name; the has function searches a property list for an object having an input property name and returns a Boolean value indicating the search results; and the clear function deletes all objects from the property list.

Listing 5 of the Appendix shows an example of how to use a type-safe heterogeneous property list. This small program creates a property list object, and inserts and retrieves different kinds of objects. If, for example, in the statement "tmp=plist.Get(sp1)" tmp was an integer instead of a string, a compilation error would occur because there is no matching get member function in the interface for class PropertyList.

Accordingly, the present invention provides, among other aspects, a method for implementing type-safe heterogeneous property lists in an object-oriented program. Other aspects and embodiments of the present invention will be apparent to those skilled in the art from consideration of the specification and practice of the invention disclosed herein. It is intended that the specification and illustrated embodiments be considered as examples only, with the true scope and spirit of the invention being indicated by the following claims.

X-541 US                                                              PATENT

```
1   APPENDIX
2
3   // LISTING 1
4   // PropName.h
5
6   #ifndef INCLUDED_PROPNAME
7   #define INCLUDED_PROPNAME
8
9   #pragma warning(disable:4786)
10
11  #include <assert.h>
12  #include <typeinfo.h>
13  #include <map>
14  #include <string>
15  using namespace std;
16
17  class PropNameNode
18  {
19      string nm;         // name of this prop
20      string type;       // type of data associated with this prop
21
22      unsigned long count;    // reference count
23
24    public:
25      PropNameNode(const char* n, const char* t) :
26                                      nm(n), type(t), count(1) {}
27
28      unsigned long IncrCount() { return ++count; }
29      unsigned long DecrCount() { return --count; }
30      const string& RetType() const { return type;}
31      const string& RetName() const { return nm;}
32  };
33
34  struct PropNameNodePtr
35  {
36      PropNameNode* ptr;
37      PropNameNodePtr(PropNameNode* pnn=0) : ptr(pnn) {}
38      PropNameNodePtr(const PropNameNodePtr& pnnp) :
39                                      ptr(pnnp.ptr) {}
40      PropNameNodePtr& operator= (const PropNameNodePtr& pnnp)
41      {
42       ptr = pnnp.ptr;
43       return *this;
44      }
45
46      operator PropNameNode* () const { return ptr; }
47  };
48
```

X-541 US                                                                PATENT

```
1   class PropName
2   {
3       typedef map<string,PropNameNodePtr> PropNameNodeFactory;
4
5     private:
6       static PropNameNodeFactory* pnnf;
7                                   // container for PropNameNode
8       static unsigned long objectsAlive;
9                                   // number of PropNames ctored
10
11      PropNameNode* pnn;          // the shared PropNameNode
12
13    protected:
14      PropName(const char* pname, const char* type);
15
16    public:
17      PropName(PropNameNode* p=0) : pnn(p) { objectsAlive++; }
18      PropName(const PropName& p) { objectsAlive++; pnn = p.pnn; }
19      virtual ~PropName();
20
21      bool operator==(const PropName& p) const
22                                   { return p.pnn == pnn; }
23      bool operator!=(const PropName& p) const
24                                   { return p.pnn != pnn; }
25      operator bool() const { return pnn != 0; }
26
27      static unsigned long ObjectsAlive() { return objectsAlive; }
28  };
29
30  template<class T>
31  class TPropName : public PropName
32  {
33    public:
34      TPropName(const char* pname) :
35                          PropName(pname,typeid(T).name()) {}
36      TPropName(int zero) : PropName(0) { assert(zero == 0); }
37      TPropName(const TPropName<T>& pn) : PropName(pn) {}
38  };
39
40  #endif
41
```

21

X-541 US                                                              PATENT

```
1   // PropName.cpp
2
3   #include <stdio.h>
4   #include <stdlib.h>
5   #include "propname.h"
6
7   PropName::PropName(const char* pName, const char* pType) :
8                                                           pnn(0)
9   {
10      objectsAlive++;
11      if(!pnnf) pnnf = new PropNameNodeFactory;
12      PropNameNodeFactory::iterator iter;
13      iter = pnnf->find(pName);
14      if (iter != pnnf->end())
15      {
16        pnn = (*iter).second;
17        pnn->IncrCount();
18        if(pnn->RetType() != pType)
19        {
20          // use fprintf to be safe if ctor'ing global or
21          // static variables
22          fprintf(stderr,"PropName '%s' redeclared with different
23                          PropType '%s'",pName, pType);
24          abort();
25        }
26      }
27      else
28      {
29        pnn = new PropNameNode(pName,pType);
30        (*pnnf)[pName] = pnn;
31      }
32   }
33
34   PropName::~PropName()
35   {
36      objectsAlive--;
37      if (pnn && !pnn->DecrCount())
38      {
39        pnnf->erase(pnn->RetName());
40        delete pnn;
41      }
42
43      if (!objectsAlive)
44      {
45        assert(!pnnf->size());
46        delete pnnf;
47        pnnf = 0;
48      }
49   }
50
```

X-541 US                                                                    PATENT

```
1   // LISTING 2
2   // Property.h
3
4   #include "propname.h"
5
6   class Property
7   {
8     private:
9       PropName pname;        // The key (id) for this element
10
11    protected:
12      Property(const PropName& pn) : pname(pn) {}
13
14    public:
15      virtual ~Property() {}
16      const PropName& RetPropName() const { return pname; }
17      bool operator ==(const PropName& pn) const
18                                            { return pname==pn; }
19      bool operator !=(const PropName& pn) const
20                                            { return pname!=pn; }
21  };
22
23  template<class T>
24  class TProperty : public Property
25  {
26      friend class PropertyList;
27    private:
28      T data;          // the data stored with this property
29
30      TProperty(const TPropName<T>& pn, const T& t) :
31                                      Property(pn), data(t) {}
32      virtual ~TProperty() {}
33
34      const T& GetData() const         { return data; }
35      T& GetData()                     { return data; }
36      void PutData(const T& t)         { data = t;    }
37      void operator=(const T& t)       { data = t;    }
38  };
39  #endif
40
```

X-541 US                                                              PATENT

```
1   // LISTING 3
2   // Plist.h
3
4   #ifndef INCLUDED_PLIST
5   #define INCLUDED_PLIST
6
7   #include "property.h"
8   #include "plistrep.h"
9
10  class PropertyList
11  {
12      PListRep* rep;      // the implementation of this list
13
14    public:
15      PropertyList(PListRep* r) : rep(r) {}
16      ~PropertyList() { rep->Clear(); delete rep; }
17
18      template<class T>
19      void Put(const TPropName<T>& p, const T& data)
20      {
21          Property* pe = rep->Get(p);
22          TProperty<T>* tpe = 0;
23          if (!pe)
24          {
25             tpe = new TProperty<T>(p,data);
26             rep->Put(tpe);
27          }
28          else
29          {
30             // Cast "pe" to the right type.  This is safe
31             // because "p", which was used to get "pe", is
32             // of type <T,pType>.
33             tpe = static_cast<TProperty<T>*> pe;
34             tpe->PutData(data);
35          }
36      }
37
38      template<class T>
39      const T& Get(const TPropName<T>& p) const
40      {
41          Property* pe = rep->Get(p);
42          if (!pe) assert(0);
43          TProperty<T>* tpe = static_cast<TProperty<T>*> pe;
44          return tpe->GetData();
45      }
46
```

X-541 US                                                                PATENT

```
1      template<class T>
2      T& Get(const TPropName<T>& p)
3      {
4          Property* pe = rep->Get(p);
5          if (!pe) assert(0);
6          TProperty<T>* tpe = static_cast<TProperty<T>*> pe;
7          return tpe->GetData();
8      }
9
10     bool Has(const PropName& p) const
11     {
12         return rep->Has(p);
13     }
14
15     void Delete(const PropName& p)
16     {
17         Property* pe = rep->Remove(p);
18         if (!pe) return;
19         delete pe;
20     }
21  };
22  #endif
23
24  // PListRep.h
25
26  #ifndef INCLUDED_PLISTREP
27  #define INCLUDED_PLISTREP
28
29  class PropName;
30  class Property;
31
32  class PListRep
33  {
34      friend class PropertyList;
35
36    protected:
37      virtual ~PListRep() {}
38    private:
39      virtual Property*  Get(const PropName& pn) const = 0;
40      virtual Property*  Get(const PropName& pn) = 0;
41      virtual void       Put(Property* elem) = 0;
42      virtual Property*  Remove(const PropName& pn) = 0;
43      virtual bool       Has(const PropName& pn) const = 0;
44      virtual void       Clear() = 0;
45  };
46  #endif
47
48
```

25

X-541 US                                                                                                    PATENT

```
1    // LISTING 4
2    // SMPList.h
3
4    #ifndef INCLUDED_SMPLIST
5    #define INCLUDED_SMPLIST
6
7    #include "plistrep.h"
8    class Property;
9
10   class SMPList : public PListRep
11   {
12       struct _elem
13       {
14         Property* e;
15         _elem* next;
16       };
17
18       _elem* first;
19
20       Property* Get(const PropName& pn) const;
21       Property* Get(const PropName& pn);
22       void      Put(Property* e);
23       Property* Remove(const PropName& pn);
24       bool      Has(const PropName& pn) const
25                                        { return (Get(pn) != 0); }
26       void      Clear();
27
28       // Only deleted through base class, when PropertyList
29       // is deleted
30       ~SMPList()  { Clear(); }
31
32     public:
33
34       // User ctors a list repr and passes ownership to class
35       // PropertyList
36       SMPList() : first(0) {}
37   };
38   #endif
39
40   // SMPList.cpp
41
42   #include "smplist.h"
43   #include "property.h"
44
45   Property* SMPList::Get(const PropName& pn) const
46   {
47       for (_elem* e=first; e && (*(e->e)!=pn); e=e->next) {}
48       return e?e->e:0;
49   }
50
```

X-541 US                                                                     PATENT

```
1   Property* SMPList::Get(const PropName& pn)
2   {
3       _elem *e=0,*prev=0;
4       for (e=first,prev=0; e && (*(e->e))!=pn;
5                                   prev=e,e=e->next) {}
6       if (!e) return 0;
7       if (prev)
8       {
9         prev->next = e->next;
10        e->next = first;
11        first = e;
12      }
13      return e->e;
14  }
15
16  void SMPList::Put(Property* e)
17  {
18      _elem* el = new _elem;
19      el->e = e;
20      el->next = first;
21      first = el;
22  }
23
24  Property* SMPList::Remove(const PropName& pn)
25  {
26      Property* ret=0;
27      _elem *e=0,*prev=0;
28      for (e=first,prev=0; e && (*(e->e))!=pn;
29                                  prev=e,e=e->next) {}
30      if (!e) return 0;
31      if (prev) prev->next = e->next;
32      else first = e;
33      ret = e->e;
34      delete e;
35      return ret;
36  }
37
38  void SMPList::Clear()
39  {
40      for (_elem *p=first,*tmp; p; p=tmp)
41                          {tmp=p->next;delete p->e;delete p;}
42      first = 0;
43  }
44
45
```

X-541 US                                                                PATENT

```
 1  // LISTING 5
 2  // tProperty.cc
 3
 4  #include "plist.h"
 5  #include "smplist.h"
 6
 7  // Instantiations of PropNames
 8  // ===========================
 9  typedef TPropName<int> intProp;
10  typedef TPropName<string> stringProp;
11  typedef TPropName<string*> stringPtrProp;
12
13  bool Has(const PropertyList& pl, const PropName& p = 0)
14  {
15      return p?pl.Has(p):0;
16  }
17
18  main()
19  {
20      PropertyList plist(new SMPList);
21      intProp    ip1("this is an int prop");
22      stringProp sp1("this is a string prop");
23      stringProp sp2("this is another string prop");
24      stringPtrProp sptrp1("this is a stringPtr prop");
25
26      plist.Put(ip1,10);
27      string tmp("hello");
28      plist.Put(sp1,tmp);
29
30      plist.Put(ip1,100);
31      tmp = " world";
32      plist.Put(sp2,tmp);
33
34      assert(Has(plist,ip1));
35      assert(!Has(plist,0));
36      assert(!Has(plist));
37      assert(Has(plist,sp1));
38      assert(!Has(plist,sptrp1));
39
40      tmp = plist.Get(sp1);
41
42      assert(tmp=="hello");
43      assert(plist.Get(ip1)==100);
44
45      assert(plist.Get(sp2)==" world");
46
47      string* sptr = new string("foobar");
48      plist.Put(sptrp1,sptr);
49
```

X-541 US                                                                                                          PATENT

```
1      string* sptr_get = plist.Get(sptrp1);
2      assert(sptr == sptr_get);
3      delete sptr_get;
4
5      return 0;
6   }
```

What is claimed is:

1. A method for implementing object-oriented property lists, comprising:

defining a library of classes and template classes implementing a heterogeneous property list, wherein each object of the property list includes a property name and an associated property value of a selected property type;

providing a constructor that prevents instantiation of objects having equal property names and unequal property types; and providing template functions each of which accesses the objects of the property list according to a type of data passed to the function.

2. The method of claim 1, wherein the property name identifies an associated property value.

3. The method of claim 1, wherein the property name identifies a property type of the property value.

4. The method of claim 1, wherein the property type is selected from the group of a user defined type, a language-defined type, a pointer to a user-defined type, and a pointer to a language-defined type.

5. The method of claim 1, wherein the property name can be constructed from the value 0.

6. The method of claim 1, further comprising providing a constructor that associates a plurality of objects having equal property names with a single property value.

7. The method of claim 1, wherein the template functions include a function to get a property value from a property list given an input property name and a function to put a property value into a property list given an input property name and property value.

8. The method of claim 7, wherein the template functions further include a function to remove an object from a property list given an input property name, a function to search a property list for an object that matches an input property name and return a Boolean value indicating whether an object was found, and a function to delete all objects from a property list.

9. The method of claim 1, further comprising implementing the property list as one of the group of a linked list, a hash table, an array, and a balanced tree.

10. A method for implementing type-safe property lists having property values of different types, comprising:

defining a first class having a property name and a property type;

defining a second class having a pointer to an object of the first class and a constructor that aborts a program instantiating an object of the second class if, for another object of the first class having a property name and property type, an input property name matches the property name of the other object and an input property type does not match the property type of the other object;

defining a third class having a member that is an object of the second class;

defining a first template class having a constructor that passes a property name and property type to the constructor of the second class;

defining a second template class having a constructor that passes an object of the first template class to the third class, a property value member, and one or more member functions for accessing the property value member;

defining a property list class having template functions that get and put objects of the second template class in a property list object, wherein the template functions have property type and property value inputs; and instantiating a property list object with selected objects of the second template class.

11. The method of claim 10, wherein the second template class is a subclass of the third class.

12. The method of claim 10, wherein the first template class is a subclass of the second class.

13. The method of claim 10, wherein the member functions of the second template class include a function to get a property value from a property list given an input property name and a function to put a property value into a property list given an input property name and property value.

14. The method of claim 13, wherein the member functions of the second template class further include a function to remove an object from a property list given an input property name, a function to search a property list for an object that matches an input property name and return a Boolean value indicating whether an object was found, and a function to delete all objects from a property list.

15. The method of claim 10, wherein the property list class includes a subclass that defines one of the group of a linked list, a hash table, an array, and a balanced tree.

16. The method of claim 10, further comprising deleting an object of the first class when no objects of the first template class reference the object of the first class.

17. The method of claim 16, further comprising:

incrementing a respective reference count when instantiating an object of the first template class that references an object of the first class;

decrementing the respective reference count when deleting an object of the first template class that references the object of the first class; and deleting the object of the first class when the respective reference count is 0.

18. An apparatus for implementing object-oriented property lists, comprising:

means for defining a library of classes and template classes implementing a heterogeneous property list, wherein each object of the property list includes a property name and an associated property value of a selected property type;

means for providing a constructor that prevents instantiation of objects having equal property names and unequal property types; and means for providing template functions each of which accesses the objects of the property list according to a type of data passed to the function.

* * * * *